United States Patent
Chodzko

[11] 3,937,079
[45] Feb. 10, 1976

[54] CALORIMETER FOR AN UNSTABLE LASER RESONATOR

[75] Inventor: Richard A. Chodzko, Palos Verdes Peninsula, Calif.

[73] Assignee: The United States of America as represented by the Secretary of the Air Force, Washington, D.C.

[22] Filed: Dec. 11, 1974

[21] Appl. No.: 531,645

[52] U.S. Cl. .................... 73/190 EW; 331/94.5 C
[51] Int. Cl.² ............................................ G01K 17/00
[58] Field of Search ................ 73/190 R; 250/352; 331/94.5 C, 94.5 R; 356/216

[56] References Cited
UNITED STATES PATENTS

| | | | |
|---|---|---|---|
| 3,289,101 | 11/1966 | Masters et al. | 331/94.5 |
| 3,426,293 | 2/1969 | Snitzer | 331/94.5 |
| 3,466,566 | 9/1969 | Patel | 331/94.5 |
| 3,573,656 | 4/1971 | Marcatili | 331/94.5 |
| 3,622,245 | 11/1971 | Rasmussen | 73/190 |
| 3,738,168 | 6/1973 | Mansell | 73/190 |
| 3,783,685 | 1/1974 | Zeiders et al. | 73/190 |

*Primary Examiner*—Herbert Goldstein
*Attorney, Agent, or Firm*—Joseph E. Rusz; Arsen Tashjian

[57] ABSTRACT

An internal cavity calorimeter for measuring the output power from an edge coupled unstable laser resonator with a variable rectangular mode geometry while containing the radiation inside the resonator. The 45° output coupling mirror of a conventional edge coupled unstable cavity is replaced by a calorimeter assembly including an absorbing copper plate having a rectangular hole of variable width w and height h to define a rectangular mode of variable width Mw and height Mh within the geometric optics approximation where M is the magnification.

4 Claims, 5 Drawing Figures

3,937,079

CALORIMETER FOR AN UNSTABLE LASER RESONATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to a device for measuring the output power of an edge coupled unstable resonator and, more particularly, the invention is concerned with providing a calorimeter which includes a flat absorbing metal plate positioned perpendicular to the optical axis of the resonator and includes a variable aperture thereby permitting the collection of information as to the lasing intensity distribution as a function of the mode geometry.

The conventional method for extracting laser power from an unstable resonator is by diffraction past the boundaries of the smallest cavity mirror. This so-called "edge coupling" technique is generally accomplished in one of two ways, either a small "finite edge" coupling mirror is suspended in the optical axis or a 45° mirror with a hole parallel to the optical axis is positioned in the optical axis. An optical window is required when the laser cavity region is below atmospheric pressure.

The mode geometry of an edge coupled unstable resonator is determined by the magnification of the mirrors and the cross sectional shape of the coupling mirror. There will be an optimum mode geometry for extracting maximum power from a specified gain region. The gain distribution in an arc driven continuous wave (CW) HF laser, for instance, cannot currently be modeled theoretically in terms of the various experimental parameters such as gas flow rates, plenum pressure, arc current and voltage etc. The measurement of the output power for different mode geometries presently requires several expensive mirrors and, typically, a vacuum output window of good optical quality. Thus, it would be most desirable and beneficial to be able to determine the optimum mode geometry for an unstable resonator by measuring experimentally the variation of output power for different mode geometries without the use of a coupling mirror or optical output window.

SUMMARY OF THE INVENTION

The present invention is concerned with providing an apparatus for measuring the output power from an edge coupled unstable resonator as a function of mode geometry without fabrication of a variety of coupling mirrors and without the need for a window. The apparatus includes a flat absorbing metal plate positioned perpendicular to the optical axis of the resonator and replacing the output coupling mirror therein. A rectangular hole in the plate is centered with and orthogonal to the cavity axis. The radiation intercepted by the plate which is preferably water cooled, provides the unstable cavity output power while containing the radiation within the cavity.

Accordingly, it is an object of the invention to provide an absorbing plate calorimeter for use with an edge coupled unstable laser resonator.

Another object of the invention is to provide apparatus for measuring the output power from an edge coupled unstable resonator as a function of mode geometry without fabrication of a variety of coupling mirrors and without the need for a window.

Still another object of the invention is to provide a variable aperture calorimeter having an absorbing "plate" constructed from four separate leaves which can be independently varied. By measuring the power in each leaf, the lasing intensity distribution pattern can be obtained.

A further object of the invention is to provide a variable aperture calorimeter which is useful for experimentally determining the optimum mode geometry for extracting maximum power from a specified gain region of an edge coupled unstable resonator.

A still further object of the invention is to provide a variable area calorimeter absorbing scraper which is suitable for determining the power tradeoff between mode width and the number of folds in a folded unstable resonator configuration.

Another still further object of the invention is to provide an apparatus for measuring the power output from a laser having high output power levels and which is inexpensive and simple to construct as compared to a typical output coupling mirror. Also, with minor modifications, the inventive concept applies to high energy pulsed lasers as well as continuous wave chemical lasers.

These and other objects, features, and advantages will become more apparent after considering the following detailed description taken in conjunction with the illustrative embodiments in the accompanying drawings wherein like reference numerals are used throughout to identify like elements.

DESCRIPTION OF PREFERRED EMBODIMENTS

Figure 1:
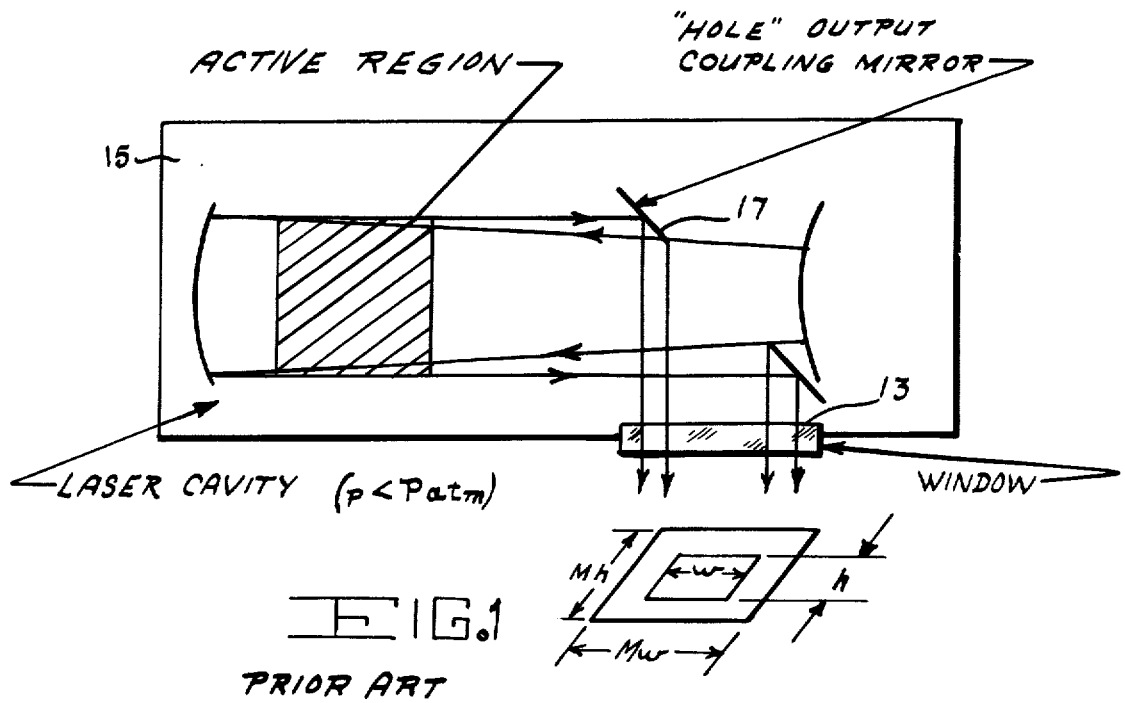
FIG. 1 is a schematic view of a prior art edge coupling technique for power extraction from an unstable cavity using a "hole" output coupling mirror.
Figure 2:
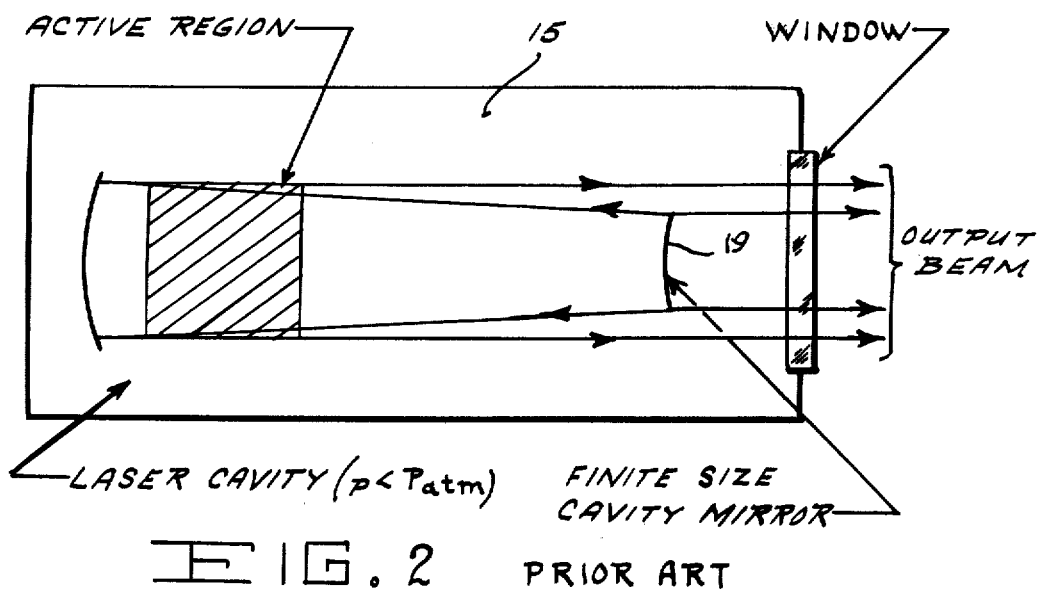
FIG. 2 is a schematic view of a prior art edge coupling technique for power extraction from an unstable cavity using "finite edge" mirror coupling with a finite size cavity mirror.

Referring now to the drawings, the conventional devices for extracting laser power from an unstable resonator is by diffraction past the boundaries of the smallest cavity mirror. This so-called "edge coupling" technique is accomplished either by the use of a 45° mirror with a hole parallel to the optical axis as shown in FIG. 1 or by the use of a suspended small mirror as shown in FIG. 2. The mode of geometry for a fixed magnification is determined by the size and shape of the hole in the output coupling mirror or, equivalently, by the size and shape of the small mirror.

In the prior art devices shown in FIGS. 1 and 2, an optical window 13 is required when the laser cavity region 15 is below atmospheric pressure. In FIG. 1 which depicts the case of a rectangular hole of width w and height h in the output coupling mirror 17, the rectangular field pattern of the output beam within the geometric approximation is shown for a magnification M. In FIG. 2, the suspended small mirror 19 operates as a "finite edge" coupling mirror so that the laser power from the unstable resonator can be extracted by diffraction past the boundaries thereof. Thus, it can be seen that the measurement of the output power from an edge coupled unstable resonator for different mode geometries has required expensive mirrors and, typically, a vacuum output window of good optical quality. In order to determine the optimum mode geometry for extracting maximum power from a specified gain region of an arc driven continuous wave HF laser for instance, it is necessary that the various experimental parameters including gas flow rates, plenum pressure, arc current and voltage, etc., be varied and the output power be determined with each of the changes in the mode geometry. The hereinafter described calorimeter measures the output power from a continuous wave edge coupled unstable resonator without the use of a coupling mirror or window and with a variable mode geometry.

Figure 3:
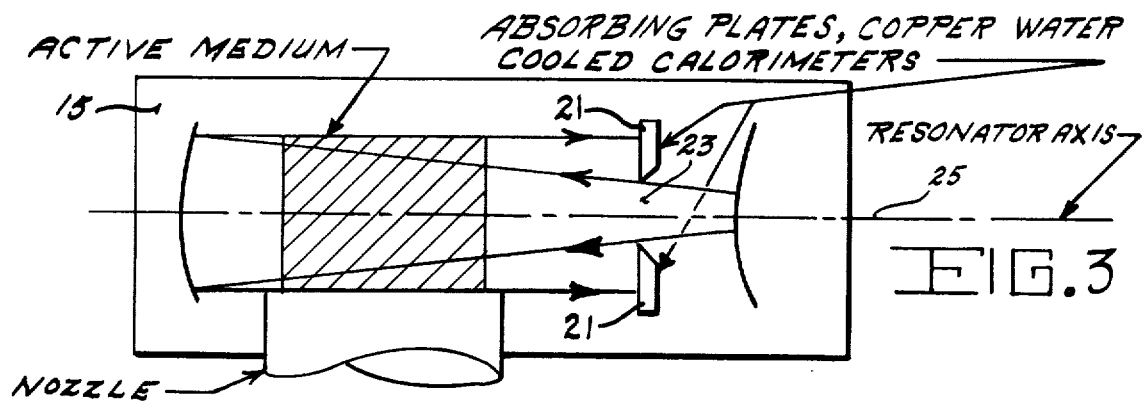
FIG. 3 is a side view of a variable aperture calorimeter-absorbing scraper according to the invention for unstable resonator power measurement.
Figure 4:
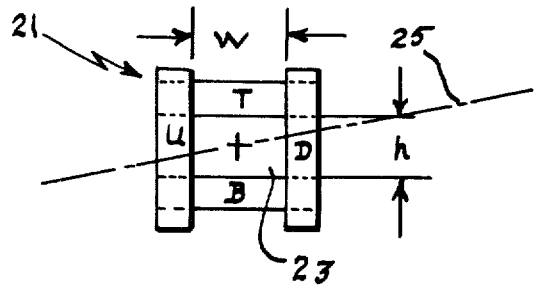
FIG. 4 is an end view of the water cooled calorimeter absorbing plates showing the variable aperture feature.

A schematic diagram of the apparatus according to the invention is shown in FIG. 3 and includes an internal calorimeter for measuring the output of a continuous wave edge coupled unstable resonator. The calorimeter includes an absorbing copper plate assembly 21 which replaces the output coupling mirror of the unstable resonator. A rectangular hole 23 in the plate 21 is centered with and orthogonal to the cavity axis 25. The radiation intercepted by the plate 21 which is preferably water cooled, provides the unstable cavity output power while containing the radiation within the cavity. In a preferred embodiment, the absorbing plate 21 is constructed from four separate movable rectangular leaves labeled T, B, U, and D (FIG. 4). By varying the location of these leaves, the height Mh and the width Mw (where M is the magnification) of the unstable cavity geometric mode can be varied independently for a fixed cavity magnification. Furthermore, by measuring the power in each leaf of the calorimeter independently, one can obtain information in the lasing intensity distribution transverse to the optical axis.

The heat absorbed in the leaves T, B, U, D of the plate 21 is measured by calorimetry and corresponds closely to that measured when the beam is output coupled through a window. The only error is the known reflection loss of the window and a small amount of spillover in the backside of the plate 21 which can be minimized by making the back surface a diffuse reflector. The front surface can be made black (greater than 98% absorption) with an oxide coating such as Ebanol"C" on copper and a thirty degree included angle groove cut. Thus the abosrbing plate calorimeter is similar to the known closed cavity power measurement technique applied to a stable resonator in that the radiation is completely contained within the resonator. It is different in the sense that it measures output power from an unstable resonator rather than the maximum potential multimode power from the active medium.

The variable aperture calorimeter (absorbing scraper) shown in FIG. 3 can be applied to a CW HF (DF) confocal unstable resonator. The output power versus mode geometry and distance of the optical axis from the nozzle exit plane can be measured for different nozzle designs, resonator magnifications and cavity pressures in both HF and DF. The top (T) and bottom (B) calorimeter leaves (see FIG. 4) are slightly displaced (approximately 0.5 in.) with respect to the upstream (U) and downstream (D) leaves to achieve the variable mode geometry. The pairs of leaves are mounted such that the hole width w and height h can be varied for a fixed optical axis position 25.

Figure 5:
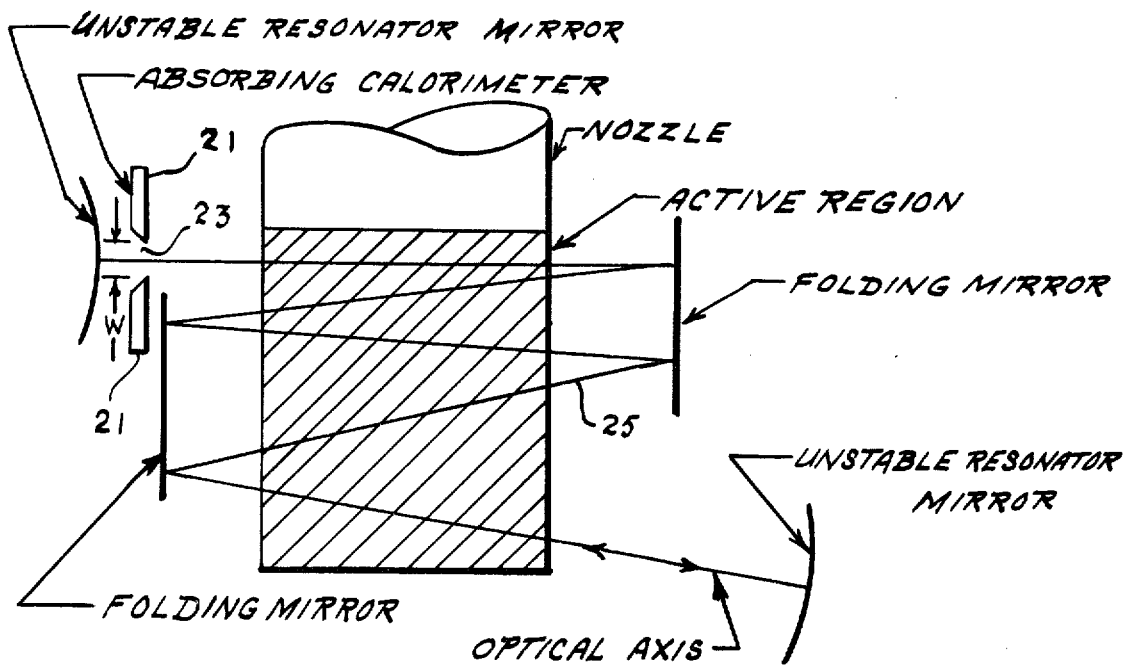
FIG. 5 is a side view of the variable aperture calorimeter technique according to the invention for determining optimum folded unstable resonator mirror geometry.

One further application for the variable area calorimeter absorbing scraper device is indicated in FIG. 5. For many devices such as CW gas dynamic $CO_2$ laser or a CW $DF-CO_2$ transfer diffusion chemical laser the positive gain region extends tens of centimeters downstream of the nozzle exit plane. In order to saturate the gain sufficiently such that all of the available single transverse mode output power is extracted, a folded unstable resonator is sometimes useful as shown in FIG. 5. By placing the absorbing calorimeter 21 outside the folding mirrors and varying the angles and positions of the cavity mirrors, the optimum mode width and number of folds required for maximum power extraction efficiency can be determined experimentally.

Thus, for a given laser and a given geometric magnification of the unstable resonator, the optimum mode geometry for maximum power extraction efficiency can be determined experimentally. In a typical experiment using a CW DF confocal unstable resonator, the internal abosrbing plate calorimeter hereinbefore described correctly measured the output power. The values of w and h were varied for the fixed optimum mirror alignment. It was found that nearly 90 percent of the power obtained with the maximum 2.5 cm wide mode is obtained with a 1.5cm wide mode. The power distribution on the variable area calorimeter leaves for several positions of the center of the rectangular hole in the plate 21 would give an indication of the optimum unstable resonator mode geometry for a given nozzle design and flow condition.

Although the invention has been illustrated in terms of preferred embodiments thereof, the invention is not limited to these embodiments or to the preferred configurations mentioned. For example, it will be apparent to those skilled in the art that the variable area calorimeter absorbing plate 21 can be fabricated of two L shaped sliding plates which allow variation in the size and shape of a rectangular mode volume. Also, it should be understood that various changes, alterations, modifications and substitutions particularly with respect to the construction details can be made in the arrangement of the several elements without departing from the true spirit and scope of the appended claims.

Having thus described my invention, what I claim and desire to secure by Letters Patent of the United States is:

1. An internal cavity calorimeter for measuring the output power from an edge coupled unstable laser resonator comprising, an absorbing metal plate positioned orthogonal to the cavity axis between the active medium and an output coupling mirror, said plate having an aperture in the central portion thereof, means for varying the size and shape of the aperture in said absorbing metal plate including four separate leaves in perpendicular relationship to one another, each of said leaves being independently movable to produce a corresponding variation of the unstable cavity geometric mode independently for a fixed cavity magnification, and means for independently measuring the power absorbed by each leaf, thereby indicating the lasing intensity distribution pattern for the unstable laser resonator while containing the radiation within the cavity.

2. The internal cavity calorimeter defined in claim 1 wherein said absorbing metal plate is fabricated of copper.

3. The internal cavity calorimeter defined in claim 1 wherein the absorbing surface of each of said leaves is coated with a black oxide coating and the inner edge of each of said leaves is provided with a thirty degree included angle, thereby making said leaves over 98 percent absorbing.

4. The internal cavity calorimeter defined in claim 3 wherein the back surface of each of said leaves is made of a diffuse reflector thereby minimizing the spillover of radiation from the absorbing surface.

* * * * *